E. & M. A. F. HAASS.
Liquid Cooler.
No. 80,945.
Patented Aug. 11, 1868.
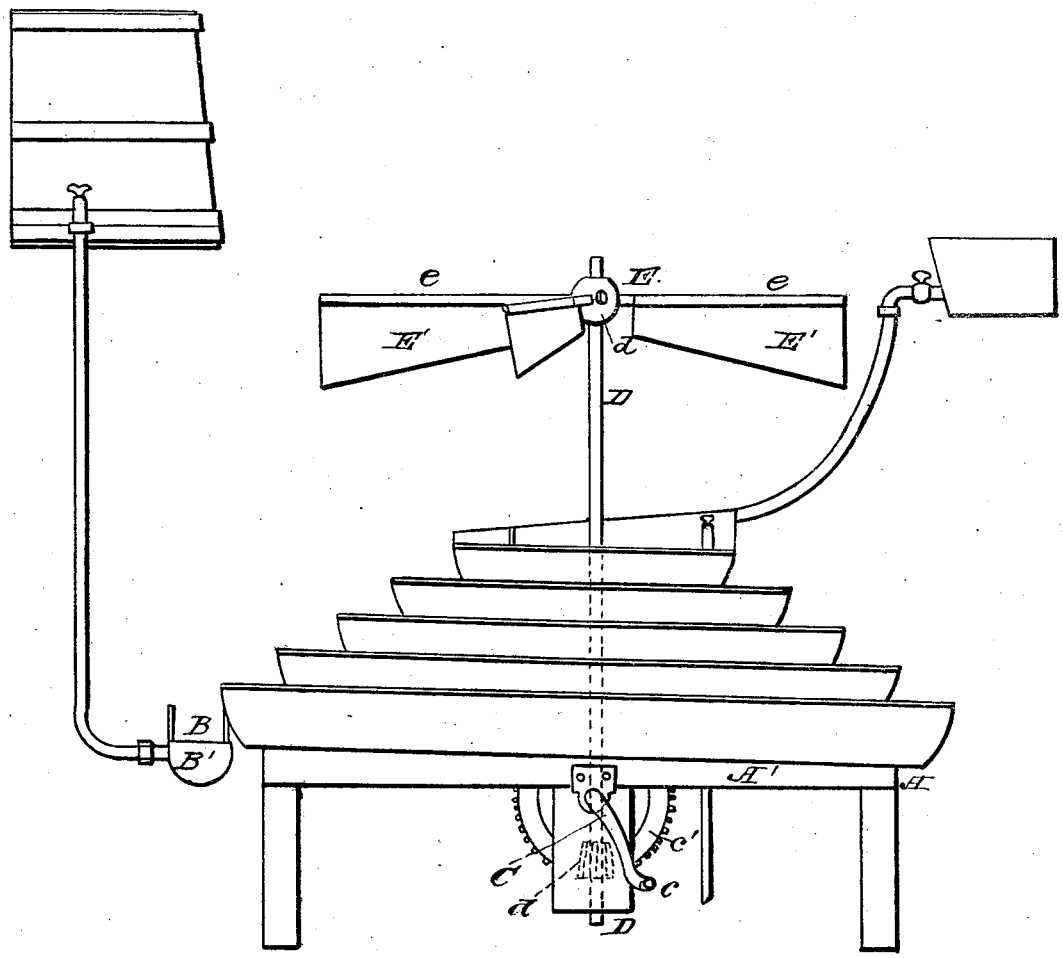
Witnesses
Fred. Thomas
N. E. Stumph
Inventor
E. & M. A. F. Haass
by J. W. Beader Atty

United States Patent Office.

EMIL HAASS AND MAX A. F. HAASS, OF MENDOTA, ILLINOIS.

Letters Patent No. 80,945, dated August 11, 1868.

IMPROVEMENT IN LIQUID-COOLERS.

*The Schedule referred to in these Letters Patent and making part of the same.*

TO ALL WHOM IT MAY CONCERN:

Be it known that we, EMIL HAASS, of Mendota, in the county of La Salle, and State of Illinois, and MAX A. F. HAASS, of Mendota, in the county of La Salle, and State of Illinois, have invented new and useful Improvements in Liquid-Coolers; and we do hereby declare that the following is a full and exact description of the same, reference being had to the accompanying drawings, and to the letters of reference marked thereon.

This invention relates to certain improvements in apparatus for cooling beer and other liquids, and consists principally in a novel combination of shallow troughs and pipes with fans, by means of which the liquid to be cooled is subjected to the action of cold water and air at the same time, as will be fully described hereinafter.

In the drawings, A represents a pyramidal frame, upon which rests the series of troughs and pipes B B', which latter are constructed as shown in Figure 1, with the semicircular pipe B' located directly beneath the trough B, the bottom of which latter forms the top of the frame. This series of troughs and pipes is all connected, being, in fact, a simple trough and pipe, which are arranged about the frame in a series of descending squares, the upper end being located upon the top of the frame A, from which point it gradually descends and passes about each side of the frame in regular succession, as shown, by which arrangement an extended incline is obtained in an exceedingly compact form.

The trough is provided at its upper end with a spout, or other suitable arrangement, in which the ale or other liquid to be cooled is received from the conducting-hose, which latter is connected with the vat. This hose passes through a wire bucket, which holds it in place. The pipe is provided, at its upper end, with a cut-off or gate, which permits the upper surface of the water, which is most heated, to pass off, but retains, for a moment, the lower portion, which is cooled. The water, in this case, is received at the lower opening, and passes out at the upper. Both ends of the pipe are so arranged that the hose may be readily attached.

C represents a horizontal shaft, hung in suitable bearings in frames A A', which is provided at one end with a crank, c, and at the other with the gear-wheel c'.

D represents a vertical shaft, hung in bearings in frame A', the lower end of which is provided with the pinion d, engaging with gear-wheel c', and the upper of which extends some distance above the troughs B, and supports the ball E, to which the fans are attached.

E represents a ball, sliding upon shaft D, which may be readily adjusted up or down, and which is retained in any desired position by means of the set-screw d'.

E' E' represent fans, attached to arms e, which are constructed with the lower edges inclined downward over the troughs. These fans are set at an angle on the arms for the purpose of driving the air down upon the troughs. The gearing is so arranged that a rapid revolution may be given to the fans by a slow movement of the crank.

The operation of my invention is as follows:

The proper connection having been made to the ends of pipe B', water is admitted from an elevated tank into the lower end, from which point it flows upward through its various turns, and is finally discharged through the hose attached to its upper end.

The gate may be so adjusted as to permit the upper surface of the water to flow off, as it is the most heated, and retain the lower portion, which is cooler.

The ale is conducted from the vat into the upper end of trough B, through which latter it runs, in a wide and shallow stream, over the cool water, which is passing in an opposite direction in the pipe below, being separated simply by the thin sheet of metal, either tin, copper, or zinc, which forms the bottom of the trough and top of the pipe.

To increase the effect produced, the fans are provided. Motion having been communicated to the crank by any suitable means, the fans are caused to revolve, and currents of air are thus thrown down upon the trough. By this operation the steam is dispelled, and cold air is kept constantly in contact with the surface of the liquid.

By this construction and arrangement, an exceedingly compact and desirable apparatus is produced in which the liquid to be cooled is subjected to the action of cold water, and also is exposed to currents of cold air. No machinery is required, as the liquids flow naturally in the desired direction.

We wish it understood that we do not claim the idea of causing the cooling-agent to flow in a contrary direction to the liquid to be cooled, for this is made the subject of a patent granted to Julius Haefer, May 22, 1865. We desire simply to cover our peculiar arrangement of cooler.

Having thus fully described our invention, what we claim as new, and desire to secure by Letters Patent, is—

The trough B and pipe B', constructed and arranged as described, in combination with fans E' E', arranged as described, the whole being operated in the manner and for the purpose set forth.

This specification signed and witnessed, this fifteenth day of May, 1868.

EMIL HAASS,
MAX A. F. HAASS.

Witnesses:
LUCAS TRANDLEY,
WM. BAUMBACH.